(12) United States Patent
Kitamura

(10) Patent No.: US 7,278,296 B2
(45) Date of Patent: Oct. 9, 2007

(54) SCANNING PROBE MICROSCOPE

(75) Inventor: Shinichi Kitamura, Saitama (JP)

(73) Assignee: JEOL Ltd., Tokyo (JP)

( * ) Notice: Subject to any disclaimer, the term of this patent is extended or adjusted under 35 U.S.C. 154(b) by 143 days.

(21) Appl. No.: 10/957,413

(22) Filed: Oct. 1, 2004

(65) Prior Publication Data
US 2005/0120781 A1    Jun. 9, 2005

(30) Foreign Application Priority Data
Oct. 2, 2003    (JP) .............................. 2003-344489

(51) Int. Cl.
*G01B 21/30* (2006.01)
(52) U.S. Cl. ...................................... 73/105
(58) Field of Classification Search ................ 73/105, 73/597, 620–631; 250/306, 307
See application file for complete search history.

(56) References Cited
U.S. PATENT DOCUMENTS
5,477,732 A * 12/1995 Yasue et al. .................. 73/105

| | | | |
|---|---|---|---|
| 5,859,638 A * | 1/1999 | Coleman et al. ............ | 715/786 |
| 6,005,246 A * | 12/1999 | Kitamura et al. ............ | 250/306 |
| 6,881,954 B1 * | 4/2005 | Morimoto et al. .......... | 250/306 |
| 2005/0040999 A1 * | 2/2005 | Numano ...................... | 345/1.1 |
| 2006/0037379 A1 * | 2/2006 | Mancevski et al. .......... | 73/1.89 |

FOREIGN PATENT DOCUMENTS
JP            08-226927            9/1996

OTHER PUBLICATIONS

Tetsuya Minobe et al., "Distance dependence of noncontact-AFM image contrast on Si(111)√3×√3 -Ag structure", *Applied Surface Science*, 140, 1999, pp. 298-303.

* cited by examiner

*Primary Examiner*—Robert Raevis
(74) *Attorney, Agent, or Firm*—The Webb Law Firm

(57) ABSTRACT

The present invention is intended to solve the problem that the tip of the probe of a scanning probe microscope cannot be conditioned stably due to overload in a contact region. This problem is solved by a scanning probe microscope for scanning the probe and a sample relative to each other. The microscope has a cantilever, a vibration means for vibrating the cantilever, and a vibration signal-switching means for switching a vibration signal applied to the vibration means between at least two different signals. The cantilever has a resilient body that supports the probe.

4 Claims, 3 Drawing Sheets

SCANNING PROBE MICROSCOPE

BACKGROUND OF THE INVENTION

1. Field of the Invention

The present invention relates to a scanning probe microscope that is a general term indicating various instruments, including scanning tunneling microscope, atomic force microscope, magnetic force microscope, frictional force microscope, micro-viscoelasticity AFM, and scanning Kelvin probe microscope (SKPM).

2. Description of Related Art

A scanning probe microscope uses a probe that is brought close to a surface of a sample made of a metal, semiconductor, insulator, or high-molecular weight material or consisting of a biological sample. The microscope scans the surface of the sample such that the tunneling current, interatomic force, or the like produced between the probe and the sample surface is maintained constant. Thus, the surface topography and physical properties are measured at the atomic level.

In the non-contact mode of atomic force microscopy, observations and measurements are performed using the interatomic attraction force between the sample surface and probe. Since the interatomic attraction force is detected from the non-contact distance and imaging is done, damage to the sample is small. Hence, the top layer of the surface of the sample can be imaged accurately. The microscope is equipped with a piezo element for vibrating the cantilever in contact with the base portion of the cantilever. The cantilever has a natural frequency of tens to hundreds of kilohertz depending on the length and thickness of the cantilever. When a driving signal of the natural frequency of oscillation is applied to the piezo element for applying vibrations from an oscillator, the free end forming the probe is vibrated up and down at an amplitude on the order of nanometers at the natural vibration frequency $f_0$. Where this state is taken as a steady state and the probe is brought close to the sample, an interatomic force acts between the probe and sample at the lowest point. When the probe receives the interatomic force, the frequency shifts downward compared with the vibrational frequency $f_0$ in the steady state. That is, the vibrational period becomes elongated.

In the non-contact mode of AFM using an optical lever technique, laser light reflected from the cantilever contains various frequency components, including components attributed to frequency variation $\Delta f$, amplitude variation $\Delta A$, and phase variation due to the action of the attraction force. Using any one of these variations as a feedback signal, the probe-sample distance is kept constant. In detecting the feedback signal, the slope detection method in which the frequency shift is indirectly detected within the atmosphere is generally used. In a vacuum, the FM detection method in which the shift is directly detected is generally used. The prior art scanning probe microscope is shown in the block diagram of FIG. 1.

Where observations and measurements are performed using a scanning probe microscope, even if probes are fabricated at the highest accuracy, good observational results may not be obtained because of atomic-level observation and because of variations in individual probes. Furthermore, during observation, foreign material may adhere to the probe, deteriorating the sensitivity.

In this case, it has been empirically known that an improvement may be achieved by increasing the amplitude of the vibrating probe and bringing the probe into contact with the sample. It is considered that the contact has deformed the state of the tip of the probe at the atomic level, creating a state adapted for observation of the atomic image. It is also considered that the adhering material has been cleaned off.

Where the prior art control computer is used and the scroll bar on the viewing screen of the computer is dragged with the mouse to change the set value of the amplitude of the probe, the scroll bar has been varied suddenly with the mouse. The set value is modified to a value at which a contact might be made or to a value at which the amplitude is slightly smaller. Then, the probe is brought into contact with the sample. This method is not a quantitative technique and so the probe may be overloaded.

Where the numerical value of the set value of the probe amplitude is entered, a value at which the probe makes contact with the sample has been entered from the keyboard of the control computer. In this case of entry of numerical value, quantitative setting is possible. However, the operation is slower than the entry from the scroll bar. If the operation is made slower, the scanning probe may be overloaded.

As a known technique, a cleaning device for the probe of a scanning probe microscope is disclosed in Japanese Patent Laid-Open No. H8-226927.

SUMMARY OF THE INVENTION

It is an object of the present invention to address the problem that the probe tip of a scanning probe microscope cannot be conditioned stably due to overload in the contact region.

A first embodiment of the present invention is a scanning probe microscope for scanning a probe and a sample relative to each other and has (a) the probe, (b) a vibration means for vibrating the probe, (c) a feedback circuit for controlling the distance between the probe and the sample according to an effect of a physical property that the vibrating probe undergoes from the sample, and (d) a reference value-switching means for switching a reference value between at least two different values, the reference value stipulating the distance between the probe and the sample controlled by the feedback circuit.

A second embodiment of the present invention is a scanning probe microscope for scanning a probe and a sample relative to each other and has (a) a cantilever having a resilient body that supports the probe, (b) a vibration means for vibrating the cantilever, (c) a feedback circuit for controlling the distance between the probe and the sample according to an effect of an interatomic force that the vibrating probe undergoes from the sample, and (d) a reference value-switching means for switching a reference value between at least two different values, the reference value stipulating the distance between the probe and the sample controlled by the feedback circuit.

A third embodiment of the present invention is based on the first or second embodiment described above and further characterized in that one of the aforementioned at least two different values is a reference value at which the sample is imaged and observed, and that another of the at least two different values is a reference value at which the tip of the probe is brought into contact with the sample, adjusting the shape of the probe.

A fourth embodiment of the present invention is based on the third embodiment and further characterized in that during the scanning, the shape of the probe is adjusted.

A fifth embodiment of the present invention is based on the third or fourth embodiment described above and further characterized in that the sample has a surface for adjusting the shape of the probe.

The scanning probe microscope according to the present invention can adjust the shape of the probe more quickly than heretofore and quantitatively.

This instrument is achieved by the provision of a vibration signal-switching means for switching a cantilever vibration signal between at least two preset signals.

Other objects and features of the present invention will appear in the course of the description thereof, which follows.

DESCRIPTION OF THE PREFERRED EMBODIMENTS

Embodiment 1

Figure 1:
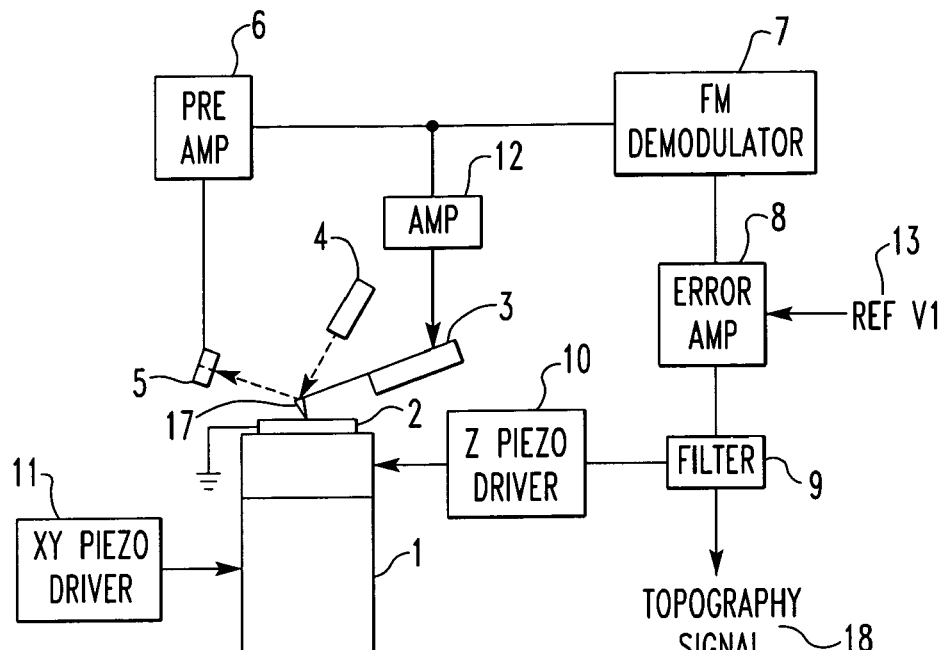
FIG. 1 is a block diagram of the prior art scanning probe microscope.

The configuration of one embodiment of the present invention is described with reference to FIG. 2, which illustrates the non-contact mode of an atomic force microscope using the FM detection method. The instrument has a scanner 1 capable of being displaced in X-, Y-, and Z-directions. The scanner 1 is made of a cylindrical piezo element. A sample 2 is placed on the top surface of the scanner 1. A cantilever 3 having a probe 17 at its front end is installed opposite to the sample 2. The cantilever 3 is made of a resilient body, such as silicon, and has a fixed end to which a vibrating piezo element 16 is attached. The rear surface of the cantilever 3 is illuminated with laser light from a laser light source 4. The reflected light is detected by a detector 5. The vibrational displacement of the cantilever 3 is detected by this optical lever detection method and electrically amplified by a preamplifier 6 incorporating a bandpass filter (not shown). A displacement signal from the cantilever 3 is converted into an electrical signal and applied to the vibrating piezo element 16 via an amplifier 12. Thus, a loop is formed. This loop further includes a phase shifter (not shown), and is set such that positive feedback oscillation occurs at the natural vibrational frequency of the cantilever 3. The amplifier 12 is so controlled that the vibration amplitude of the cantilever 3 or the vibration frequency applied to the vibrating piezo element 16 is kept constant. The probe is scanned in two dimensions by the XY piezo driver 11.

The vibrational waveform is branched into two; one is applied to an FM demodulator 7 made of a PLL. The demodulator 7 outputs a voltage corresponding to the oscillation frequency, i.e., frequency-to-voltage conversion is performed. There is a relation given by $f_0 \propto \sqrt{k-F'}$ between the gradient F' of the force acting between the probe 17 and the sample 2 and the natural vibrational frequency $f_0$ of the cantilever 3 having a spring constant of k. A variation (frequency shift) in the frequency $f_0$ substantially corresponds to the gradient F'. Z motion of the piezo scanner 1 is controlled via a filter 9 and a Z piezo driver 10 such that the frequency of a signal corresponding to the frequency-to-voltage converted signal is shifted by a given amount from the natural vibrational frequency by an error amplifier 8. The frequency shift that is maintained constant is set by a first reference voltage 13. A signal that controls the Z motion at this time (i.e., the output from the filter 9) corresponds to a surface topography signal 18. The piezo scanner 1 is scanned in two dimensions according to a scan signal. The resulting Z motion is used as a brightness signal. In this way, a topographic image is obtained.

The gradient of the force acting between the probe 17 and sample 2 can be varied by varying the first reference voltage 13 that sets the frequency shift. If the setting is so made that the frequency shift is increased, and if the cantilever 3 is operated from the non-contact mode, the cantilever will arrive at a position closest to the sample due to vibrations of the cantilever. At this position, the cantilever can be set in the contact region. Under this condition, the state at the tip of the probe 17 is liable to vary at atomic level and can be made appropriate for observation of atomic image.

Figure 5:
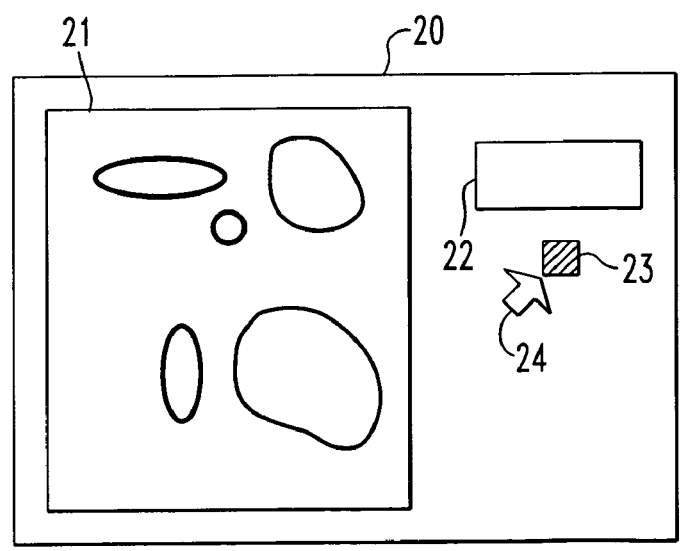
FIG. 5 shows the viewing screen of the control computer used in Embodiment 1 of the present invention.
Figure 4:
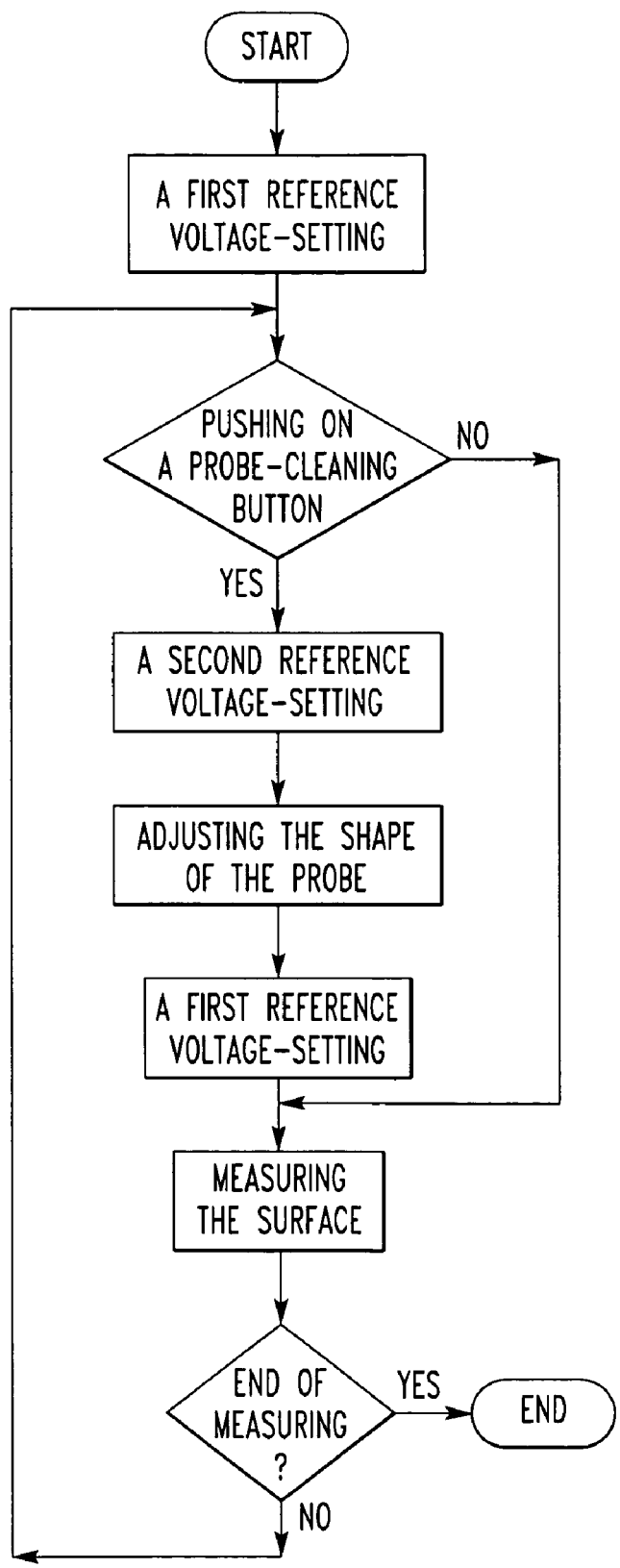
FIG. 4 is a flowchart illustrating the operation of a control computer used in Embodiment 1 of the present invention.

In the present invention, a second reference voltage 14 is used to set a second frequency shift. That is, the second reference voltage 14 is used to preset a value at which the probe 17 lightly touches the sample 2. The voltage is switched between the first reference voltage 13 and second reference voltage 14 by a reference voltage-switching means 19. This switching means 19 is implemented by software loaded in a computer (not shown) for controlling purposes. FIG. 4 is a flowchart illustrating the operation executed by the software. FIG. 5 shows the viewing screen of the computer. The viewing screen is indicated by numeral 20. Displayed on the viewing screen 20 are a topographic image display window 21, a first reference voltage-setting box 22, a probe-cleaning button 23, and so on.

Figure 2:
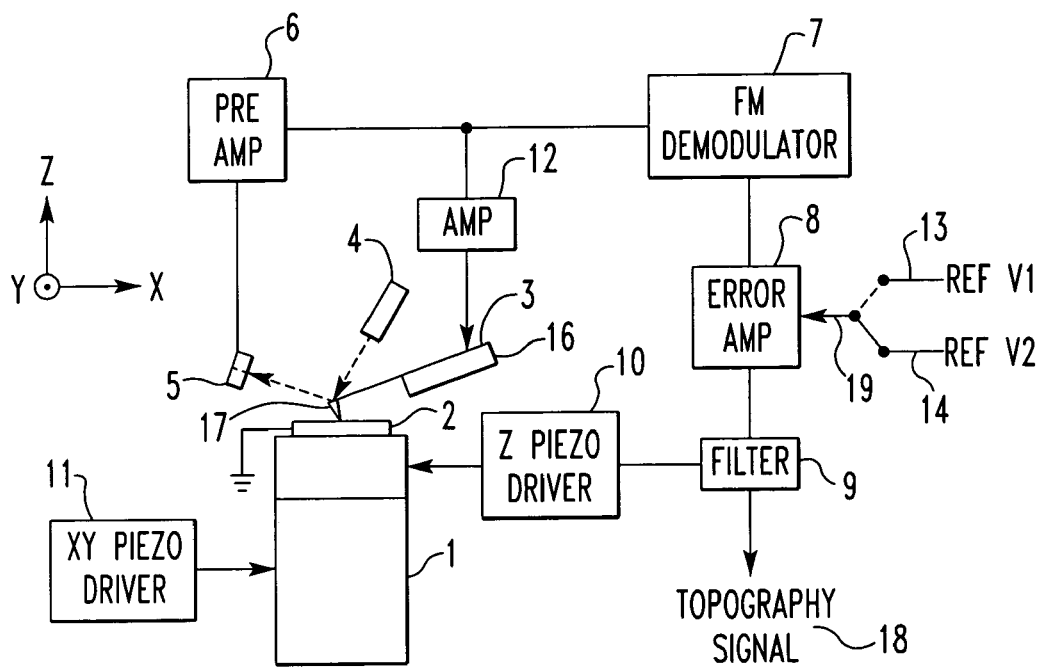
FIG. 2 is a block diagram of a scanning probe microscope according to Embodiment 1 of the present invention.

The various portions of the configuration shown in FIG. 2 have been described so far. The operation is described below. During normal observation, the first reference voltage 13 is set to the frequency shift value used during image observation. During image observation in which XY scans are being made, the operator brings the mouse pointer 24 into the position of the probe-cleaning button 23 prepared by the aforementioned software. A button (not shown) on the mouse is depressed. The voltage is switched to the second reference voltage 14 at which the frequency shift is set to a larger value during depression of the button. During this interval, the tip of the probe 17 repeatedly vibrates and lightly touches the surface of the sample 2. The tip of the probe 17 is made suitable for observation of atomic image. If depression of the button on the mouse is ceased, the voltage is returned to the original first reference voltage 13. Thus, observation is enabled.

It is to be understood that the present invention is not limited to the above embodiment but rather various changes and modifications are possible. For example, cleaning may be done while the XY-scans are stopped. The probe may be made to lightly touch the sample during the period between the instant when the probe-cleaning button 23 is depressed and the instant when a predetermined period has passed. The timing at which the voltage is returned from the second reference voltage 14 to the first reference voltage 13 may be determined according to the amount of variation of either the output from the PLL or the output from the filter 9. The amount of variation of the output from the PLL increases when the probe 17 is optimized. Where the probe 17 is optimized with the same frequency shift, the probe 17 is brought closer to the sample 2. Furthermore, the reference voltage-switching means may be made of hardware, such as a selector switch. In addition, a tuning fork or needle sensor may be used instead of the cantilever. The frequency may be detected using a quartz oscillator.

Embodiment 2

Figure 3:
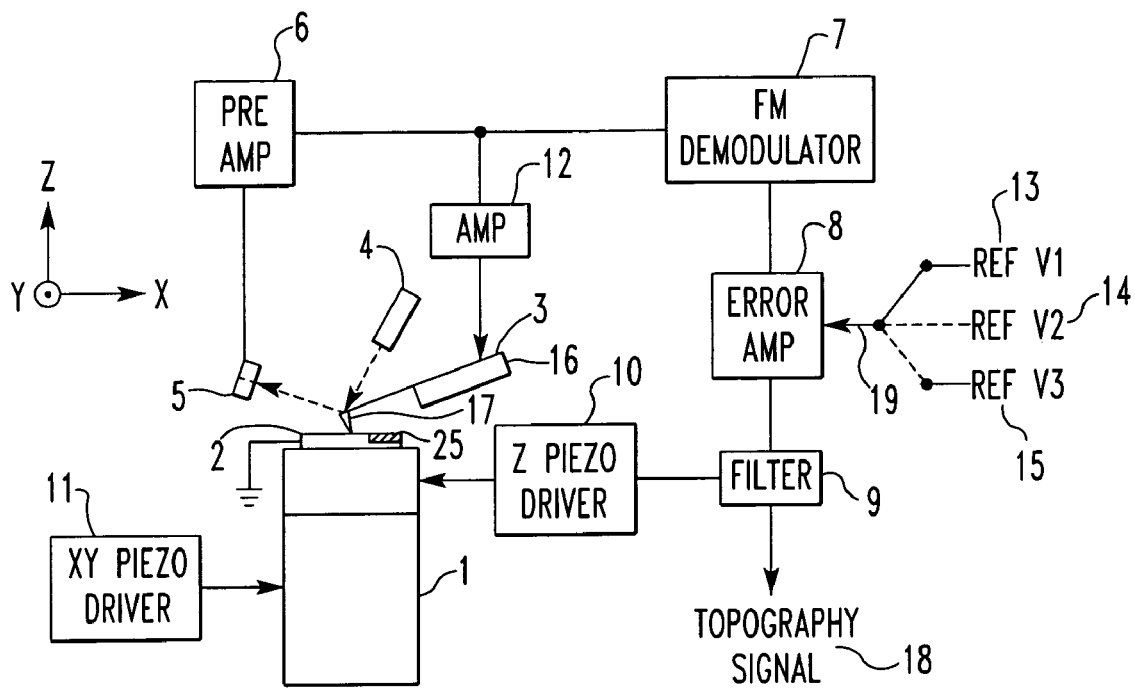
FIG. 3 is a block diagram of a scanning probe microscope according to Embodiment 2 of the present invention.

FIG. 3 shows another embodiment of the present invention. This embodiment is similar to the embodiment described in connection with FIG. 2 in terms of fundamental configuration and operation. This embodiment is characterized in that the voltage can be switched to a third reference voltage 15. In FIGS. 2 and 3, like components are indicated by like reference numerals. The components which have been already described will not be described below.

When the probe 17 is brought into contact with the sample 2 and the tip of the probe 17 is in a state adapted for observation of atomic image, the frequency shift can be set smaller than during the first observation of image in most cases. Accordingly, after returning from the second reference voltage 14, the voltage is switched to the third reference voltage 15 at which the frequency shift is set smaller than when the voltage was initially set to the first reference voltage 13. After the state of the probe is improved, the state can be maintained more stably.

A surface 25 for cleaning the probe 17 is formed on the sample 2. This surface 25 does not permit easy attachment of foreign material to the probe 17. Where the voltage is switched to the second reference voltage 14, data about the present position of the probe is stored in a memory (not shown), and then the scanner 1 is displaced. The probe 17 is placed over the probe-cleaning surface 25. Then, the probe 17 touches the cleaning surface 25. When the voltage is subsequently switched to the third reference voltage 15, the scanner 1 is displaced. Thus, the probe 17 is returned to the original position whose data has been stored in the memory. Observation then is started or restricted.

Having thus described my invention with the detail and particularity required by the Patent Laws, what is desired protected by Letters Patent is set forth in the following claims.

The invention claimed is:

1. A scanning probe microscope for scanning a probe and a sample relative to each other, said scanning probe microscope comprising:

a vibration means for vibrating the probe;

a Z motion drive means for varying the distance between said probe and said sample;

a feedback circuit for controlling the distance between the probe and the sample by controlling said Z motion drive means according to an effect of a physical property that the vibrating probe undergoes from the sample; and a computer-controlled multiple throw switch for switching a reference value between at least two different values, the reference value stipulating the distance between the probe and the sample controlled by the feedback circuit one of said two reference values being a value at which the sample is imaged and observed in the non-contact mode and the other at which the tip of the probe is brought into contact with a surface to adjust the shape of the probe tip.

2. A scanning probe microscope for scanning in X and Y directions a probe and a sample relative to each other, said scanning probe microscope comprising:

a cantilever having a resilient body that supports the probe;

a vibration means for vibrating the cantilever;

a Z motion drive means for varying the distance between said probe and said sample;

a feedback circuit for controlling the distance between the probe and the sample by controlling said Z motion drive according to an effect of an interatomic force that the vibrating probe undergoes from the sample; and a computer-controlled multiple throw switch for switching a reference value between at least two different values, the reference value stipulating the distance between the probe and the sample controlled by the feedback circuit one of said two reference values being a value at which the sample is imaged and observed in the non-contact mode and the other at which the tip of the probe is brought into contact with a surface to adjust the shape of the probe tip.

3. A scanning probe microscope as set forth in claim 1 or 2, wherein during the scanning, the shape of the probe is adjusted.

4. A scanning probe microscope as set forth in claim 1 or 2, wherein the sample has a surface for adjusting the shape of the probe.

* * * * *